US006758294B2

(12) United States Patent
Peddycord et al.

(10) Patent No.: US 6,758,294 B2
(45) Date of Patent: Jul. 6, 2004

(54) LATERALLY DAMPED PANHARD ROD CAB SUSPENSION

(75) Inventors: Jeff Peddycord, Walnut Cove, NC (US); Al Wingate, High Point, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 24 days.

(21) Appl. No.: 10/166,217

(22) Filed: Jun. 10, 2002

(65) Prior Publication Data

US 2003/0226700 A1 Dec. 11, 2003

(51) Int. Cl.[7] .............................................. B62D 49/00
(52) U.S. Cl. ............................. 180/89.12; 296/190.07
(58) Field of Search ................... 296/190.07; 180/89.12, 180/89.13; 280/124.107, 124.106

(56) References Cited

U.S. PATENT DOCUMENTS

| | | | |
|---|---|---|---|
| 4,063,361 A | | 12/1977 | Hyler et al. |
| 4,116,298 A | | 9/1978 | Hyler |
| 4,207,691 A | | 6/1980 | Hyler et al. |
| 4,207,692 A | | 6/1980 | Hyler et al. |
| 4,541,653 A | * | 9/1985 | Raidel ................. 280/124.109 |
| 4,589,677 A | * | 5/1986 | Matschinsky ........ 280/124.156 |
| 4,629,021 A | * | 12/1986 | Somerton-Rayner ......... 180/24 |
| 4,637,627 A | * | 1/1987 | Stone ......................... 280/686 |
| 4,765,650 A | * | 8/1988 | Kameshima et al. .. 280/124.116 |
| 5,253,853 A | * | 10/1993 | Conaway et al. ............ 267/256 |
| 5,310,212 A | * | 5/1994 | Uno et al. ............. 280/124.111 |
| 5,368,118 A | | 11/1994 | Hoefle |
| 5,445,404 A | * | 8/1995 | Shida et al. .......... 280/124.116 |
| 5,553,911 A | | 9/1996 | Bodin et al. |
| 5,984,036 A | * | 11/1999 | Higuchi et al. ........... 180/89.12 |
| 6,179,328 B1 | * | 1/2001 | Kawagoe et al. ........... 280/788 |
| 6,206,422 B1 | | 3/2001 | Goddard |
| 6,478,102 B1 | * | 11/2002 | Puterbaugh et al. ...... 180/89.12 |
| 2002/0162697 A1 | * | 11/2002 | Taylor et al. ............. 180/89.13 |
| 2002/0190495 A1 | * | 12/2002 | Hamada et al. ....... 280/124.166 |

FOREIGN PATENT DOCUMENTS

| | | | |
|---|---|---|---|
| EP | 0 273 796 | 6/1988 | |
| FR | 2557666 A3 * | 7/1985 | ......... B60G/17/033 |
| GB | 2 244 745 | 12/1981 | |
| GB | 2 191 456 | 12/1987 | |
| GB | 2319995 A * | 6/1998 | ............ A61G/3/02 |
| JP | 0730911 | 11/1995 | |

* cited by examiner

Primary Examiner—Michael J. Carone
Assistant Examiner—Troy Chambers
(74) Attorney, Agent, or Firm—Watts Hoffmann Co., L.P.A.

(57) ABSTRACT

A suspension for a cab of an over the highway truck or tractor. The suspension includes a pair of spaced apart springs and a pair of spaced apart motion dampers interposed between and connected to the cab and a frame of the truck or tractor. A third spring is mounted to one of the frame or the cab. A panhard rod has a first end connected to the third spring. A second end of the panhard rod is connected to one of the frame or cab that does not mount the third spring. The third spring biases the cab to a centered position relative to the frame.

30 Claims, 5 Drawing Sheets

LATERALLY DAMPED PANHARD ROD CAB SUSPENSION

FIELD OF THE INVENTION

The present invention relates generally to a cab suspension for an over-the-highway truck or tractor vehicle. In particular, the present invention relates to a laterally damped panhard rod cab suspension.

BACKGROUND OF THE INVENTION

Over-the-highway truck or tractor vehicles include a frame for supporting an operator's cab. The frame is typically supported by load springs extending between the frame and the axles of the vehicle. Due to the relatively large load that such a vehicle transports, the load springs have a relatively high spring rate. Thus, any uneven road surface that the vehicle is operating over or any imbalance or untrueness of the tire and wheel assemblies of the vehicle results in a shock or vibration that is transmitted to the operator's cab.

Cab suspensions have been developed which include cab springs and dampers located between the vehicle frame and operator's cab to minimize transmission of such shock and vibration to the cab. On most conventional heavy trucks, the rear suspension includes air or coil springs and vertical shock absorbers to support the mass of the cab and dampen vertical shock. Existing cab suspensions use a panhard rod or lateral shock absorbers to control lateral movement of the cab with respect to the frame.

Panhard rods are used heavy trucks that have day cabs. Sleeper cabs are typically heavier than day cabs. As a result, use of a panhard rod in a sleeper cab suspension may not result in an acceptable level of comfort for the driver and passenger due to the greater mass of the sleeper cab trying to laterally move.

Lateral shocks are used in sleeper cabs to soften the lateral inputs into the cab. The lateral shock absorbers are mounted to the cab and frame with brackets. The lateral shocks and mounting brackets are heavier and more expensive than a panhard rod.

There is a need for a cab suspension for heavy trucks that includes a laterally damped panhard rod.

SUMMARY OF THE INVENTION

The present invention concerns a laterally damped panhard rod for use in a cab suspension of an over the highway truck or tractor. The laterally damped panhard rod assembly includes a torsion spring and a panhard rod. The torsion spring is connected to a frame of the vehicle or the cab. A first end of the panhard rod is connected to the torsion spring. The second end of the panhard rod is connected to the vehicle frame or cab that does not mount the torsion spring. The panhard rod and torsion spring assembly biases the cab toward a centered position relative to the frame and damps lateral movement of the cab with respect to the frame.

In one embodiment, the panhard rod and torsion spring assembly is used in a suspension for a cab of an over the highway truck or tractor having a frame. The frame includes a pair of spaced apart frame rails and a transverse member that interconnects the rails. The suspension includes first and second spaced apart springs that are interposed between and connected to the cab and to the transverse member for modulating relative motion of the cab with respect to the frame. A pair of spaced apart motion dampers are interposed between and connected to the cab and transverse frame member. The motion dampers interconnect the cab and the frame to damp relative cab and frame movement both toward and away from one another. The torsion spring is connected to the transverse member of the frame or the cab. The first end of the panhard rod is connected to the torsion spring. The second end of the panhard rod is connected to the other of the transverse member of the frame and the cab. In one embodiment, the suspension that includes a panhard rod and torsion spring assembly is used in a suspension of a sleeper cab.

When installed in a cab suspension of an over the highway truck or tractor, the panhard rod and torsion spring biases the cab toward a centered position relative to the frame. The panhard rod and torsion spring assembly maintains the cab in the centered position when inputs to the frame are below a threshold value. The torsion spring allows lateral movement of the cab from the centered position when inputs to the frame exceed the threshold value. The torsion spring damps relative lateral movement between the cab and the frame.

Additional features of the invention will become apparent and a fuller understanding will be obtained by reading the following detailed description in connection with the accompanying drawings.

DETAILED DESCRIPTION OF THE INVENTION

Figure 1:
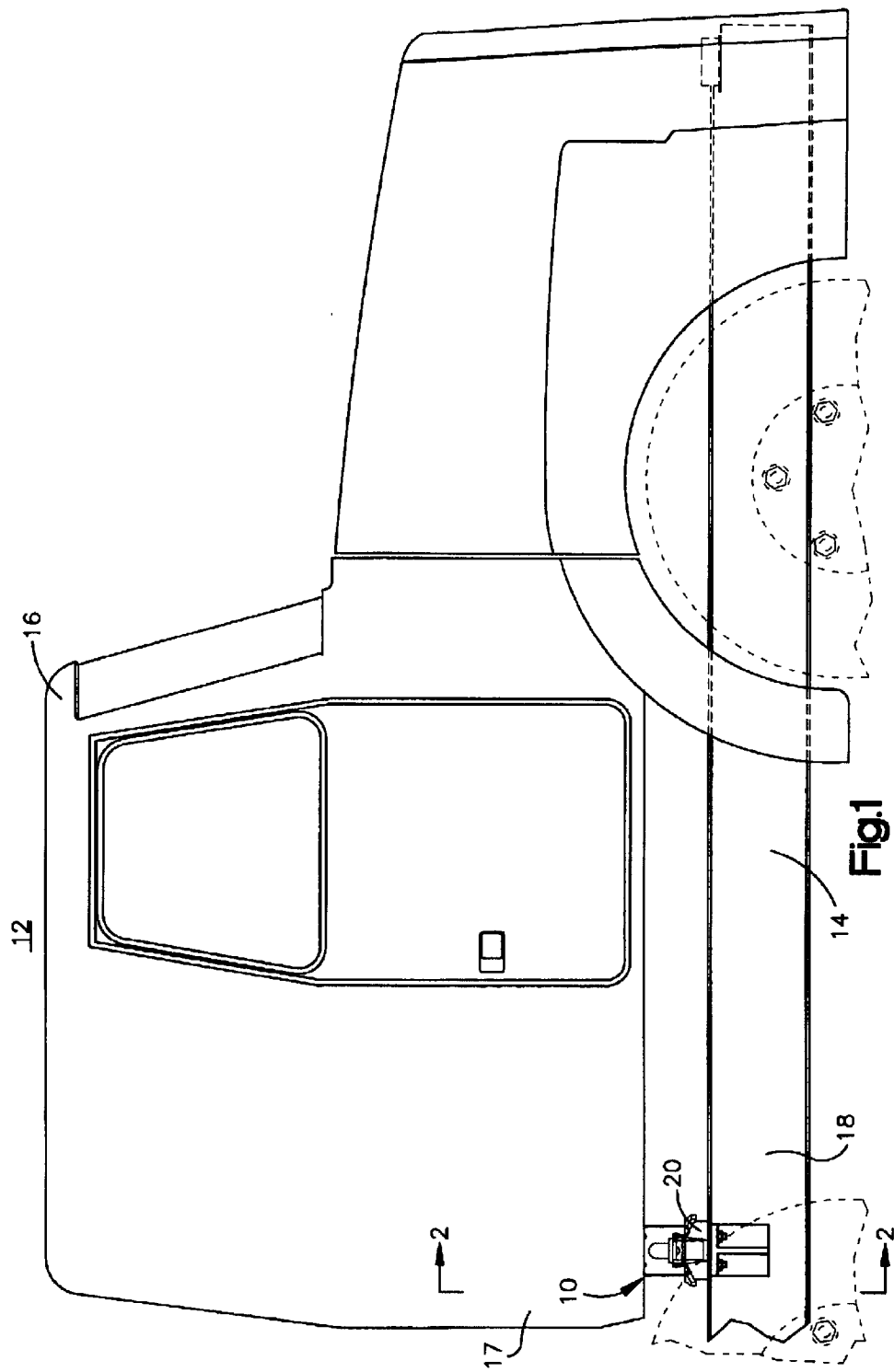
FIG. 1 is a side elevational view of a portion of an over the highway tractor having a cab suspension system embodying the present invention.

The present disclosure concerns a suspension 10 for an over the highway truck or tractor vehicle 12. The vehicle 12 includes a frame 14 that supports an operator's cab 16. The illustrated cab 16 is a sleeper cab. The frame 14 includes a pair of longitudinal, or fore and aft, extending rails 18 and a transverse member 20 that is positioned on and interconnects the rails. In the illustrated embodiment, the transverse member 20 extends laterally beyond the rails 18.

The suspension 10 supports the cab 16 for limited movement relative to the frame 14. The illustrated suspension 10 is located under a rearward portion 17 of the cab.

In the exemplary embodiment, the suspension 10 includes first and second spaced apart springs 22 interposed between and connected to the cab 16 and the transverse member 20. The springs 22 modulate relative motion of the cab with respect to the frame 14. A pair of spaced apart motion dampers 24 are interposed between and connected to the cab 16 and the transverse member 20. The motion dampers 24 interconnect the cab and frame to damp relative cab and frame movement both toward and away from one another. A third spring 26, which in the exemplary embodiment is a torsion spring, is connected to the transverse member 20 or the cab 16. In the illustrated embodiment, the torsion spring 26 is connected to the transverse member 20. In the illustrated embodiment, a first end 28 of a pan hard rod 30 is connected to the torsion spring and second end 32 is connected to the cab 16. The pan hard rod 30 and torsion spring 26 bias the cab 16 toward a centered position relative to the frame 14. In the exemplary embodiment, the torsion spring includes rubber elements 33 (FIGS. 5A and 5B) that damp lateral movements of the cab 16.

Figure 2:
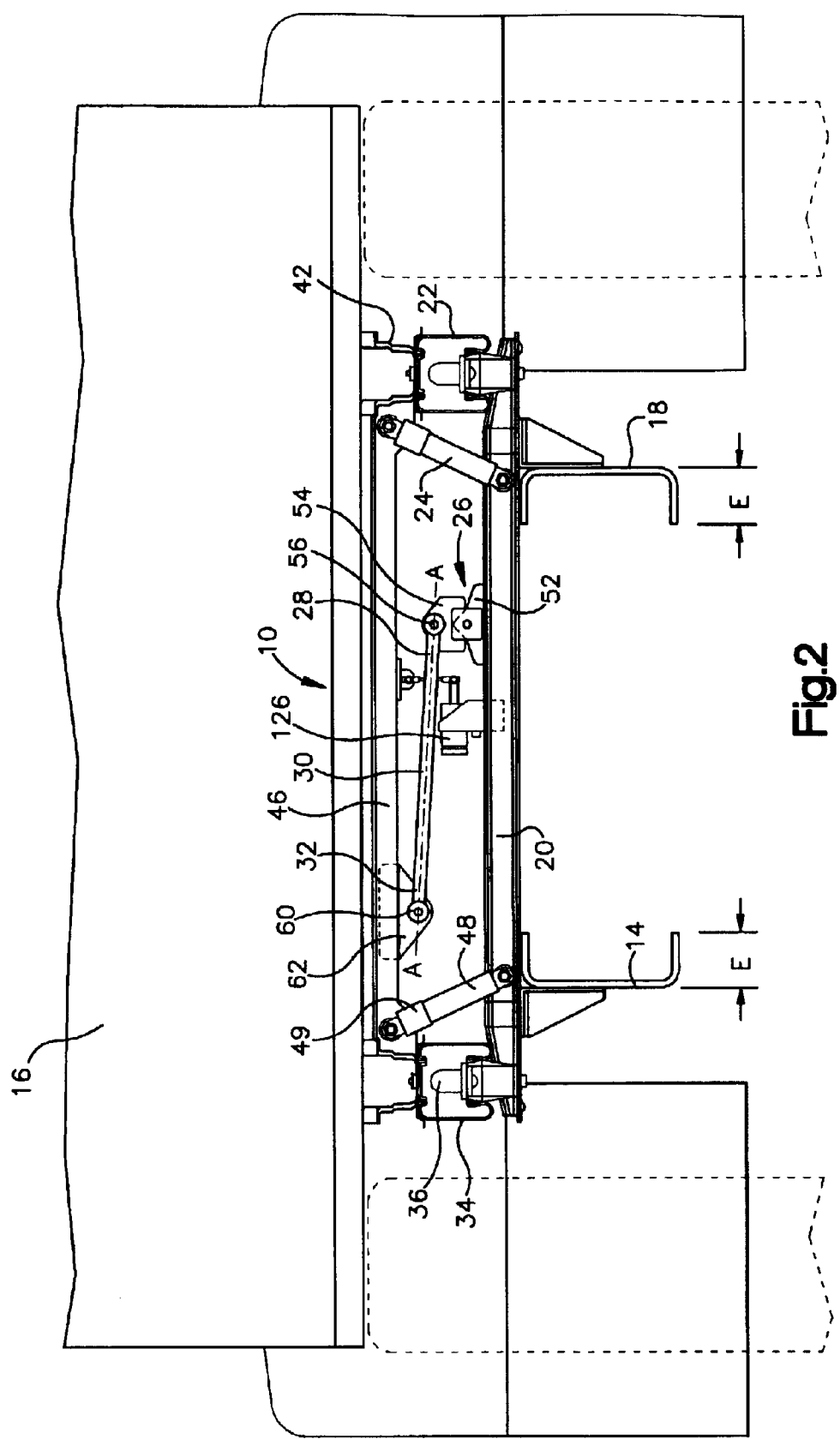
FIG. 2 is a fragmentary rear elevational view of the cab and suspension system of FIG. 1 as seen from the plane indicated by line 2—2 in FIG. 1.
Figure 3:
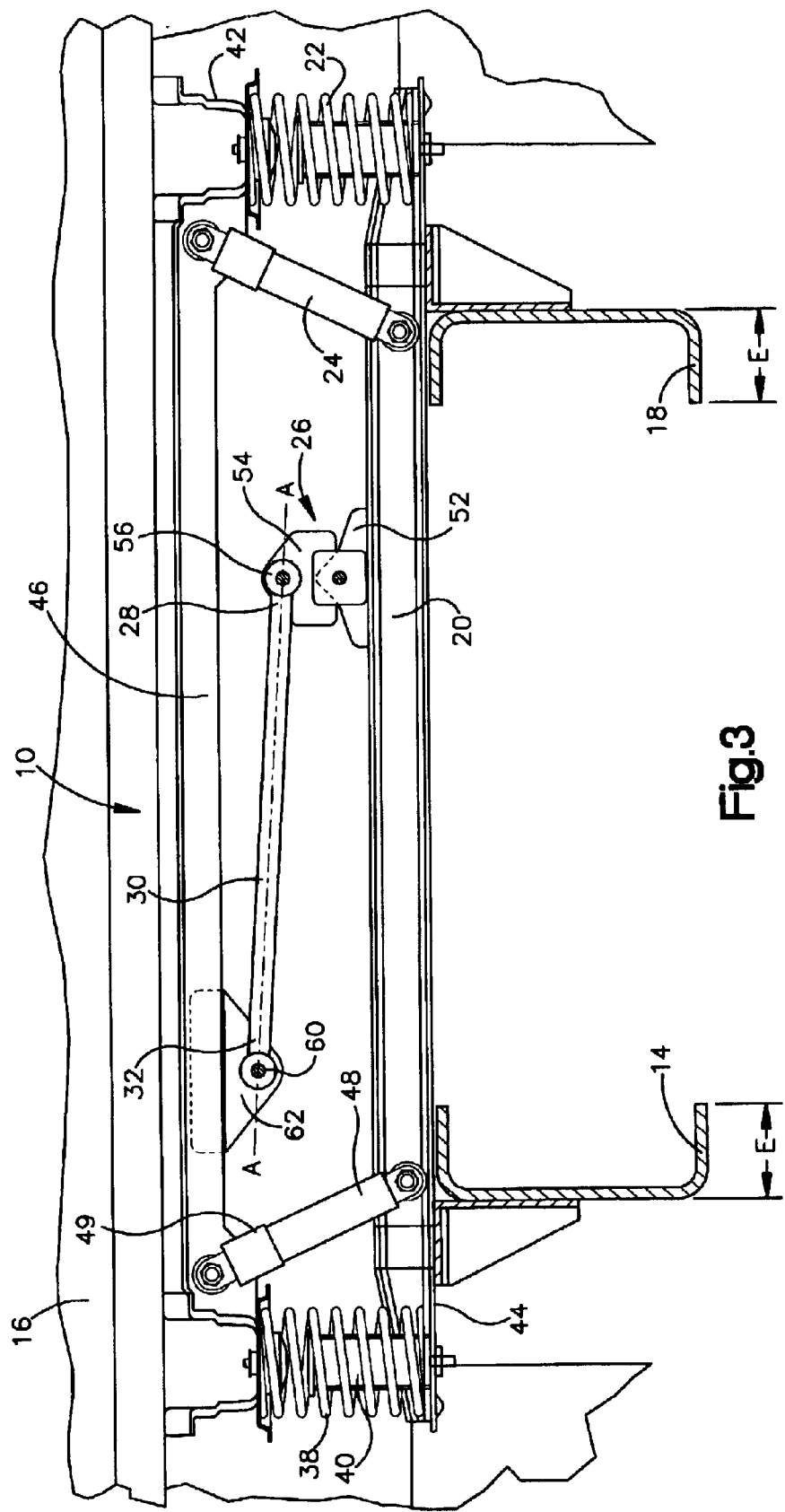
FIG. 3 is a view similar to FIG. 2 illustrating an alternate embodiment of the cab suspension system.
Figure 4:
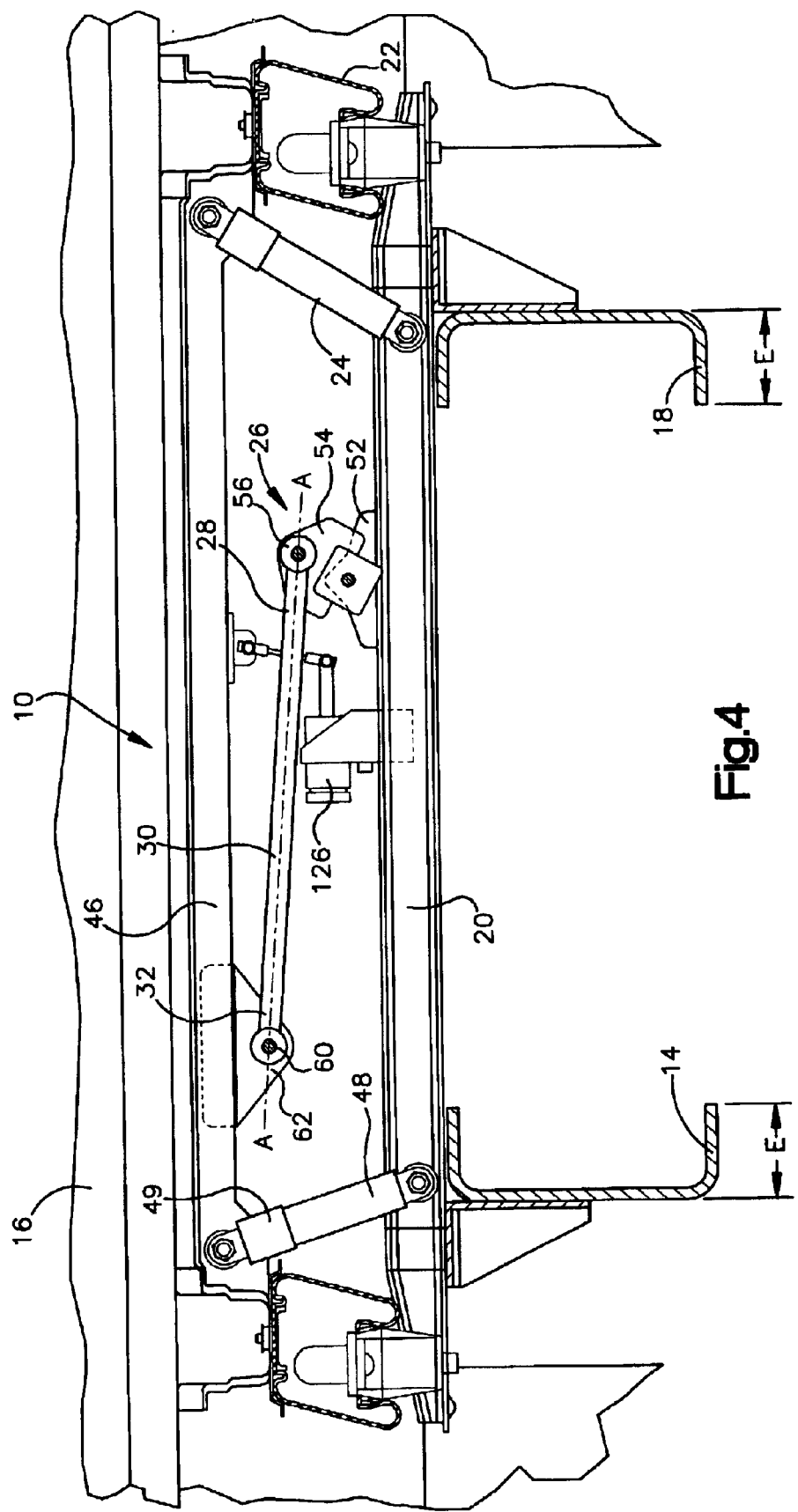
FIG. 4 is a perspective view of a panhard rod and torsion spring assembly.

FIGS. 2 and 3 illustrate two alternate embodiments of the suspension 10. While the structures are different, the function of the suspension 10 is the same. In the embodiment illustrated in FIG. 2, the suspension 10 includes a pair of air springs 34 and a pair of vertical travel limits 36 in the form of elastomeric bumpers. Pressure within each of the air springs 34 is monitored and established by a controller 126. The controller 126 monitors the relative position or distance between the cab 16 and the frame 14 and controls fluid pressure between the air springs 34 as a function of the relative distance between the cab and the transverse member. In the embodiment illustrated by FIG. 3, the suspension 10 includes a pair of coil springs 38 and vertical travel limits 40 extending coaxially within the springs.

In either of the disclosed embodiments, the springs 22 are spaced apart transversely on the transverse member 20. Each of the springs is located between the transverse member and a longitudinally extending support 42 on the bottom or under floor of the cab 16. Each spring 34, 38 is located substantially as far as possible out board on respective cantilevered end portions 44 of the transverse member 20. In the exemplary embodiment, the springs 34, 38 are located as close to the corners at the rear of the cab as feasible.

In the exemplary embodiment, a transversely extending cab frame member 46 is located under the cab 16. A pair of laterally spaced apart upright dampers 24 are connected between the transverse member 20 and the cab frame member 46. The upright dampers 24 damp and control primarily vertical movement of the cab relative to the frame. In the exemplary embodiment, the upright dampers 24 are shock absorbers that are located between the springs 22. In the exemplary embodiment, the upright dampers 24 are located as close as feasible to an associated spring 22 to maximize damping at each rearward corner of the cab 16.

A lower end 48 of each damper 24 is connected to the transverse member 20 at a location substantially within the lateral extent E of a rail 18. An upper end 49 of each upright damper is connected to the cab frame member 46 at a location that is laterally outward of a frame rail 18. Such a canted orientation causes the upright motion dampers 24 to modulate a portion of rolling and/or transverse movement of the cab 16 relative to the frame 14.

The torsion spring 26 and pan hard rod 30 are located between the upright dampers 24. The torsion spring 26 and pan hard rod 30 controls the rolling and/or transverse movement of the cab 16 relative to the frame 14. The torsion spring 26 damps lateral movement of the cab relative to the frame 14. In addition, the torsion spring biases the cab to a neutral or centered position relative to the frame. In the illustrated embodiment, the torsion spring 26 is connected to or includes a bracket 52 connected to the transverse member 20.

In the illustrated embodiment, the torsion spring 26 includes mounting flanges 54. In the illustrated embodiment, the first end 28 of the pan hard rod 30 includes a bushing 56. A first end 28 of the pan hard rod 30 is rotatably connected to the mounting flanges 54 of the torsional spring by a bolt that extends through the mounting flanges 54 of the torsion spring and the bushing 56 of the first pan hard rod end 28. In the exemplary embodiment, the bolt 58 and the axis of the torsion spring are perpendicular to the axis A of the pan hard rod 30. The second end 32 of the pan hard rod 30 includes a bushing 60. The second end 32 of the pan hard rod 30 is rotatably connected to the underside of the vehicle cab by the bushing. The bushing 60 is rotatably connected to a bracket 62 that is connected to the cab frame member by a bolt.

Figure 5A:
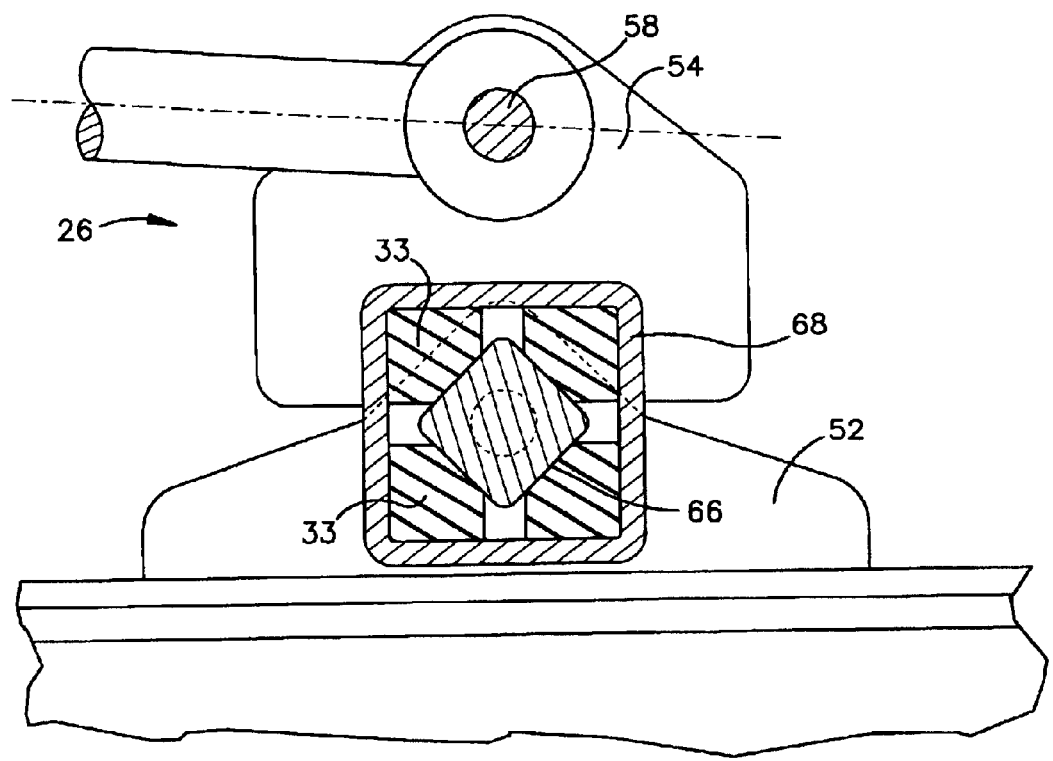
FIG. 5A is an elevational view of a torsion spring in a centered position.
Figure 5B:
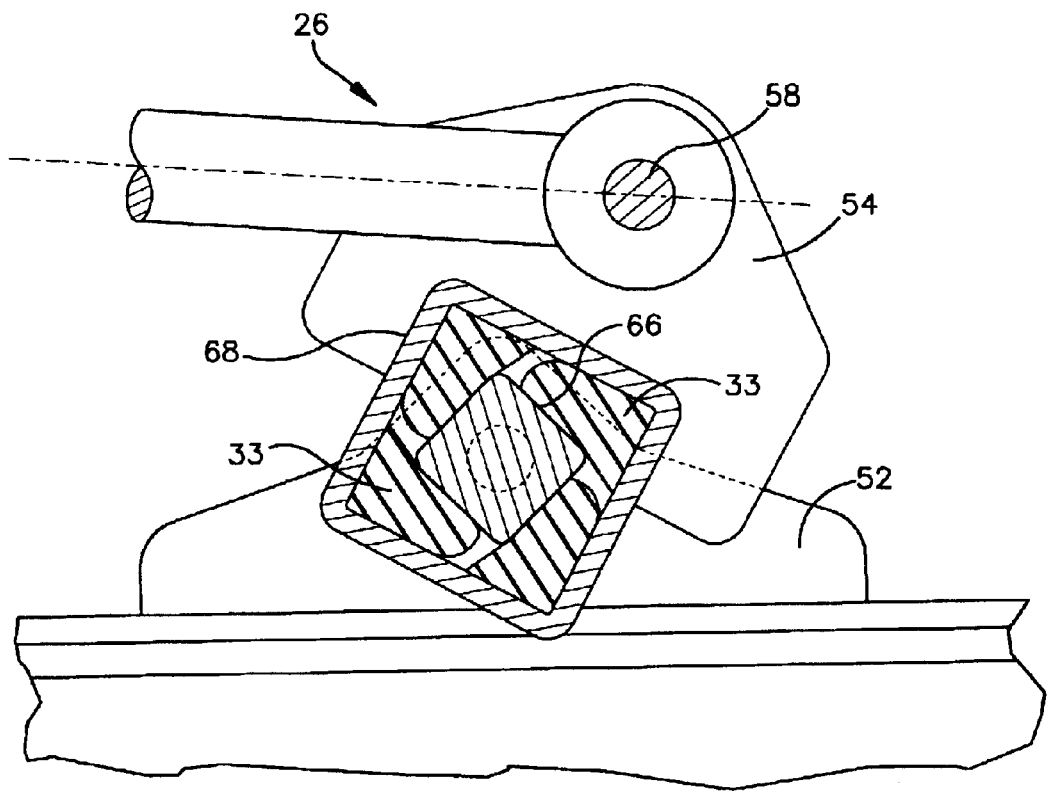
FIG. 5B is an elevational view of a torsion spring in a rotated position.

Referring to FIGS. 5A and 5B, the illustrated torsion spring includes an inner sleeve 66 that is attached to the bracket 52 and an outer sleeve 68 attached to the first pan hard rod end 28. The inner and outer sleeves 66, 68 are interconnected by rubber elements 33 disposed between the inner and outer sleeves. The rubber elements provide a spring effect and damping capability.

The design of the pan hard rod, which includes bushings on both ends, allows for cab motion in the vertical direction by allowing the bushing to twist axially. The bushings also damp some of the vibrations transmitted from the chassis to the cab.

The torsion spring is configured to maintain the cab in a centered position between the chassis frame rails. When chassis input is great enough to force the cab to move laterally, the torsion spring rotates in the direction of the cab movement, allowing the cab to move laterally. The torsion spring is configured to restrict lateral movement to a specified distance. After the cab has moved a desired distance as a result of its mass and the chassis input, the torsion spring returns the cab to its nominal center position relative to the frame rails. In the exemplary embodiment, the torsion spring is stiff enough that it will keep the cab centered on the chassis like a standard pan hard rod does, but will allow lateral movement when required.

Although the present invention has been described with a degree of particularity, it is the intent that the invention include all modifications and alterations falling within the spirit or scope of the appended claims.

We claim:

1. A suspension for a cab of an over the highway truck or tractor having a frame that includes a pair of spaced apart frame rails and a transverse member interconnecting the rails, said suspension comprising:
   a) first and second spaced apart springs interposed between and connected to said cab and to said transverse member for modulating relative motion of said cab with respect to said frame;
   b) a pair of spaced apart motion dampers interposed between and connected to said cab and said transverse member, said motion dampers interconnecting said cab and said frame to damp relative cab and frame movement both toward and away from one another;
   c) a third spring connected to one of said transverse member and said cab; and
   d) an elongated rigid rod having a first end connected to said third spring and a second end connected to an other of said transverse member and said cab, said rod and third spring adapted to bias said cab toward a centered position relative to said frame.

2. The suspension of claim 1 wherein said third spring is a torsion spring.

3. The suspension of claim 1 wherein said third spring is a rubber torsion spring that damps lateral movements of said cab.

4. The suspension of claim 1 wherein said third spring is connected to said transverse member, said first rod end is connected to said third spring, and said second rod end is connected to said cab.

5. In a suspension for a sleeper cab of an over the highway truck or tractor having a frame that includes a pair of spaced apart frame rails and a transverse member interconnecting the rails, said suspension comprising:
   a) pair of spaced apart springs interposed between and connected to said cab and to said transverse member for modulating relative motion of said cab with respect to said frame;
   b) a pair of spaced apart motion dampers interposed between and connected to said cab and said transverse member at locations between the pair of springs, said motion dampers being oppositely canted at acute angles relative to the frame, said motion dampers interconnecting said cab and said frame to damp relative cab and frame movement both toward and away from one another;
   c) an elongated rigid rod connected at a first end to said cab; and
   d) a torsion spring interposed between and connected to said rod and said transverse member, said rod and torsion spring positioned between said motion dampen, said rod and torsion spring adapted to bias said cab toward a centered position relative to said frame.

6. The suspension of claim 5 wherein said torsion spring is a rubber torsion spring that provides damping of lateral movements.

7. A method of damping relative lateral movements between a cab and a frame of an over the highway truck or tractor, comprising:
   a) connecting a spring to one of said frame and said cab;
   b) connecting a first end of an elongated rigid rod to said spring;
   c) connecting a second end of said elongated rigid rod to an other of said frame and said cab;
   d) biasing said cab toward a centered position relative to said frame;
   e) maintaining said cab in said centered position when inputs to said frame are below a threshold value;
   f) allowing lateral movement of said cab from said centered position when said inputs exceed said threshold value; and
   g) damping relative lateral movements between said cab and said frame with said spring.

8. The method of claim 7 wherein said spring is a torsion spring.

9. The method of claim 7 wherein said spring is a rubber torsion spring that damps said lateral movements of said cab.

10. A method of damping relative lateral movements between a cab and a frame of an over the highway truck or tractor, comprising:
   a) connecting a torsion spring to one of said frame;
   b) connecting a first end of an elongated rigid rod to said torsion spring;
   c) connecting a second end of said elongated rigid rod to said cab;
   d) biasing said cab toward a centered position relative to said frame;
   e) maintaining said cab in said centered position when inputs to said frame are below a threshold value;
   f) allowing lateral movement of said cab from said centered position when said inputs exceed said threshold value; and
   g) damping relative lateral movements between said cab and said frame with said spring.

11. A cab suspension configured to bias a cab of a truck or tractor vehicle toward a neutral or centered position relative to a support frame therefore, said cab suspension comprising:
   an elongate pan hard rod rotatably coupled, at each of two ends thereof, between two mountings, one of said two mountings configured for mounting to a cab of a truck or tractor vehicle and the other of said two mountings configured for mounting to a support frame for the cab; and
   one of said mountings further comprising a torsion spring, said torsion spring configured to bias said elongate pan hard rod toward a neutral or centered position corresponding to a neutral or centered position of the cab relative to the support frame for the cab.

12. The cab suspension as recited in claim 11, further comprising:
   a plurality of spaced apart springs configured to suspend the cab of a truck or tractor vehicle relative to the support frame.

13. The cab suspension as recited in claim 11, further comprising:
   a plurality of spaced apart motion dampers configured to dampen movement of the cab of a truck or tractor vehicle toward and away from the support frame.

14. The cab suspension as recited in claim 11, wherein said elongate pan hard rod has a fixed length.

15. The cab suspension as recited in claim 11, further comprising:
   a bushing interconnecting said elongate pan hard rod to mounting flanges of said mounting that comprises said torsion spring, said bushing configured to facilitate relative rotation between said elongate pan hard rod and said mounting flanges.

16. The cab suspension as recited in claim 11, further comprising:
   said elongate pan hard rod being interconnected to said mounting that comprises said torsion spring by a bushing, said bushing configured to facilitate relative rotation between said elongate pan hard rod and said mounting.

17. The cab suspension as recited in claim 16, said mounting that comprises said torsion spring further comprising:
   an outer sleeve rotatably interconnected to said elongate pan hard rod via said bushing;
   an inner sleeve configured for rotation relative to said outer sleeve and for fixed orientation relative to the cab of the vehicle or the support frame depending upon to which said mounting, that comprises said torsion spring, shall be mounted; and
   a plurality of rubber elements positioned between said outer sleeve and said inner sleeve, said rubber elements configured to bias said outer sleeve, relative to said inner sleeve, toward a configuration that corresponds to the neutral or centered position of the cab relative to the support frame.

18. The cab suspension as recited in claim 11, said mounting that comprises said torsion spring further comprising:
   an outer sleeve rotatably connected relative to said elongate pan hard rod;
   an inner sleeve configured for rotation relative to said outer sleeve and for fixed orientation relative to the cab of the vehicle or the support frame depending upon to which said mounting, that comprises said torsion spring, shall be mounted; and a rubber element positioned between said outer sleeve and said inner sleeve, said rubber element configured to bias said outer sleeve, relative to said inner sleeve, toward a configuration that corresponds to the neutral or centered position of the cab relative to the support frame.

19. The cab suspension as recited in claim 18, wherein said outer sleeve and said inner sleeve are each substantially square in cross-sectional shape.

20. The cab suspension as recited in claim 19, wherein longitudinal axes of said outer sleeve and said inner sleeve are each configured for substantially parallel orientation to a longitudinal axis of the vehicle.

21. The cab suspension as recited in claim 11, wherein a longitudinal axis of said elongate pan hard rod is configured for transverse orientation to a longitudinal axis of the vehicle.

22. A truck or tractor vehicle in which a cab of the vehicle is biased toward a neutral or centered position relative to a support frame for the cab, said vehicle comprising:

a cab of a truck or tractor vehicle suspended upon a chassis, said cab biased toward a neutral or centered position relative to a support frame of said chassis;

an elongate pan hard rod rotatably coupled, at each of two ends thereof, between two mountings, one of said two mountings mounted to the cab and the other of said two mountings mounted to the support frame; and one of said mountings further comprising a torsion spring, said torsion spring configured to bias said cab, via said elongate pan hard rod, toward a neutral or centered position relative to the support frame.

23. The vehicle as recited in claim 22, further comprising:

said elongate pan hard rod being interconnected to said mounting that comprises said torsion spring by a bushing, said bushing configured to facilitate relative rotation between said elongate pan hard rod and said mounting.

24. The vehicle as recited in claim 23, said mounting that comprises said torsion spring further comprising:

an outer sleeve rotatably interconnected to said elongate pan hard rod via said bushing;

an inner sleeve configured for rotation relative to said outer sleeve and for fixed orientation relative to the cab of the vehicle or the support frame depending upon to which said mounting, that comprises said torsion spring, is mounted; and a plurality of rubber elements positioned between said outer sleeve and said inner sleeve, said rubber elements biasing said outer sleeve, relative to said inner sleeve, toward a configuration that corresponds to the neutral or centered position of the cab relative to the support frame.

25. The vehicle as recited in claim 24, wherein said outer sleeve and said inner sleeve are each substantially square in cross-sectional shape.

26. The vehicle as recited in claim 25, wherein longitudinal axes of said outer sleeve and said inner sleeve are each configured for substantially parallel orientation to a longitudinal axis of the vehicle.

27. The vehicle as recited in claim 22, wherein a longitudinal axis of said elongate pan hard rod is configured for transverse orientation to a longitudinal axis of the vehicle.

28. The vehicle as recited in claim 22, further comprising:

a plurality of spaced apart springs configured to suspend the cab of a truck or tractor vehicle relative to the support frame.

29. The vehicle as recited in claim 22, further comprising:

a plurality of spaced apart motion dampers configured to dampen movement of the cab of a truck or tractor vehicle toward and away from the support frame.

30. The vehicle as recited in claim 22, wherein said elongate pan hard rod has a fixed length.

* * * * *